US009980374B2

(12) United States Patent
Pavageau et al.

(10) Patent No.: US 9,980,374 B2
(45) Date of Patent: May 22, 2018

(54) SUPPORT ENTERING INTO THE FABRICATION OF AN ELECTRONIC DEVICE, CORRESPONDING MEMORY CARD CONNECTOR, MEMORY CARD READ TERMINAL AND MANUFACTURING METHOD

(71) Applicant: INGENICO GROUP, Paris (FR)

(72) Inventors: Stephane Pavageau, La Roche de Glun (FR); Xavier Lambert, Rueil Malmaison (FR)

(73) Assignee: INGENICO GROUP, Paris (FR)

( * ) Notice: Subject to any disclaimer, the term of this patent is extended or adjusted under 35 U.S.C. 154(b) by 59 days.

(21) Appl. No.: 15/033,836

(22) PCT Filed: Oct. 24, 2014

(86) PCT No.: PCT/EP2014/072821
§ 371 (c)(1),
(2) Date: May 2, 2016

(87) PCT Pub. No.: WO2015/062981
PCT Pub. Date: May 7, 2015

(65) Prior Publication Data
US 2016/0270219 A1  Sep. 15, 2016

(30) Foreign Application Priority Data
Oct. 30, 2013 (FR) .................................... 13 60602

(51) Int. Cl.
*H05K 7/00* (2006.01)
*H05K 1/02* (2006.01)
(Continued)

(52) U.S. Cl.
CPC ......... *H05K 1/0284* (2013.01); *B23K 1/0016* (2013.01); *G06F 21/86* (2013.01);
(Continued)

(58) Field of Classification Search
CPC ... B23K 1/0016; B23K 2201/42; G06F 21/86; G06K 7/0091; H05K 1/0275;
(Continued)

(56) References Cited

U.S. PATENT DOCUMENTS 7,074,059 B2* 7/2006 Valcher ................ G06K 7/0013
439/108
2003/0022537 A1* 1/2003 Bricaud ............... G06K 7/0021
439/152

(Continued)

FOREIGN PATENT DOCUMENTS

DE 102009026466 B3 7/2010
EP 1927931 A1 6/2008
EP 2241997 A1 10/2010

OTHER PUBLICATIONS

International Search Report and Written Opinion dated Nov. 13, 2014 for corresponding International Application No. PCT/EP2014/072821, filed Oct. 24, 2014.

(Continued)

*Primary Examiner* — Yuriy Semenenko
(74) *Attorney, Agent, or Firm* — David D. Brush; Westman Champlin & Koehler, P.A.

(57) ABSTRACT

A support is provided for fabrication of an electronic device. The support includes at least one component to be protected and at least one three-dimensional element of a height at least equal to a height of the electronic component. The three-dimensional element is disposed laterally opposite the at least one component to be protected. The three-dimensional element is chiefly constituted of a permanent assembling material.

9 Claims, 3 Drawing Sheets

Figure 1:
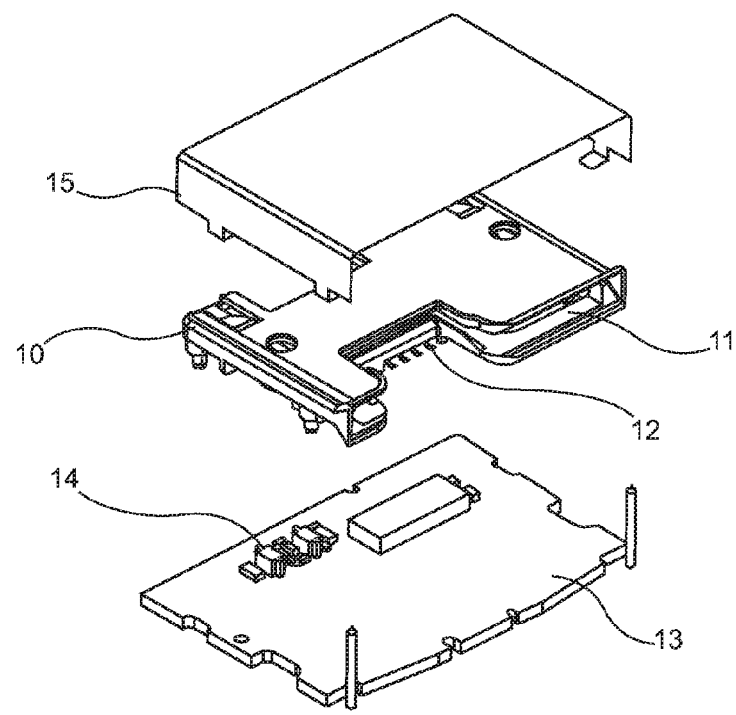

(51) Int. Cl.

| | | |
|---|---|---|
| *G06K 7/00* | (2006.01) | |
| *G06F 21/86* | (2013.01) | |
| *B23K 1/00* | (2006.01) | |
| *H05K 3/10* | (2006.01) | |
| *H05K 3/34* | (2006.01) | |
| *H05K 3/12* | (2006.01) | |
| *H05K 3/14* | (2006.01) | |
| *H05K 3/24* | (2006.01) | |
| *B23K 101/42* | (2006.01) | |

(52) U.S. Cl.
CPC ........ *G06K 7/0091* (2013.01); *H05K 1/0275* (2013.01); *H05K 3/10* (2013.01); *H05K 3/34* (2013.01); *B23K 2201/42* (2013.01); *H05K 3/1241* (2013.01); *H05K 3/1275* (2013.01); *H05K 3/143* (2013.01); *H05K 3/245* (2013.01); *H05K 2201/098* (2013.01); *H05K 2201/09409* (2013.01); *H05K 2201/09781* (2013.01); *H05K 2201/10204* (2013.01); *H05K 2203/0551* (2013.01)

(58) Field of Classification Search
CPC ....... H05K 1/0284; H05K 2201/09409; H05K 2201/09781; H05K 2201/098; H05K 2201/10204; H05K 2203/0551; H05K 3/10; H05K 3/1241
See application file for complete search history.

(56) References Cited

U.S. PATENT DOCUMENTS

| | | | | |
|---|---|---|---|---|
| 2005/0219832 | A1* | 10/2005 | Pawlenko | H05K 5/0013 |
| | | | | 361/818 |
| 2006/0040558 | A1* | 2/2006 | Ho | H01R 23/6873 |
| | | | | 439/607.01 |
| 2008/0001307 | A1* | 1/2008 | de Mevergnies | H01L 23/585 |
| | | | | 257/778 |
| 2010/0265681 | A1* | 10/2010 | Lambert | G06K 7/0021 |
| | | | | 361/760 |

OTHER PUBLICATIONS

English translation of the International Written Opinion dated Nov. 13, 2014 for corresponding International Application No. PCT/EP2014/072821, filed Oct. 24, 2014.

* cited by examiner

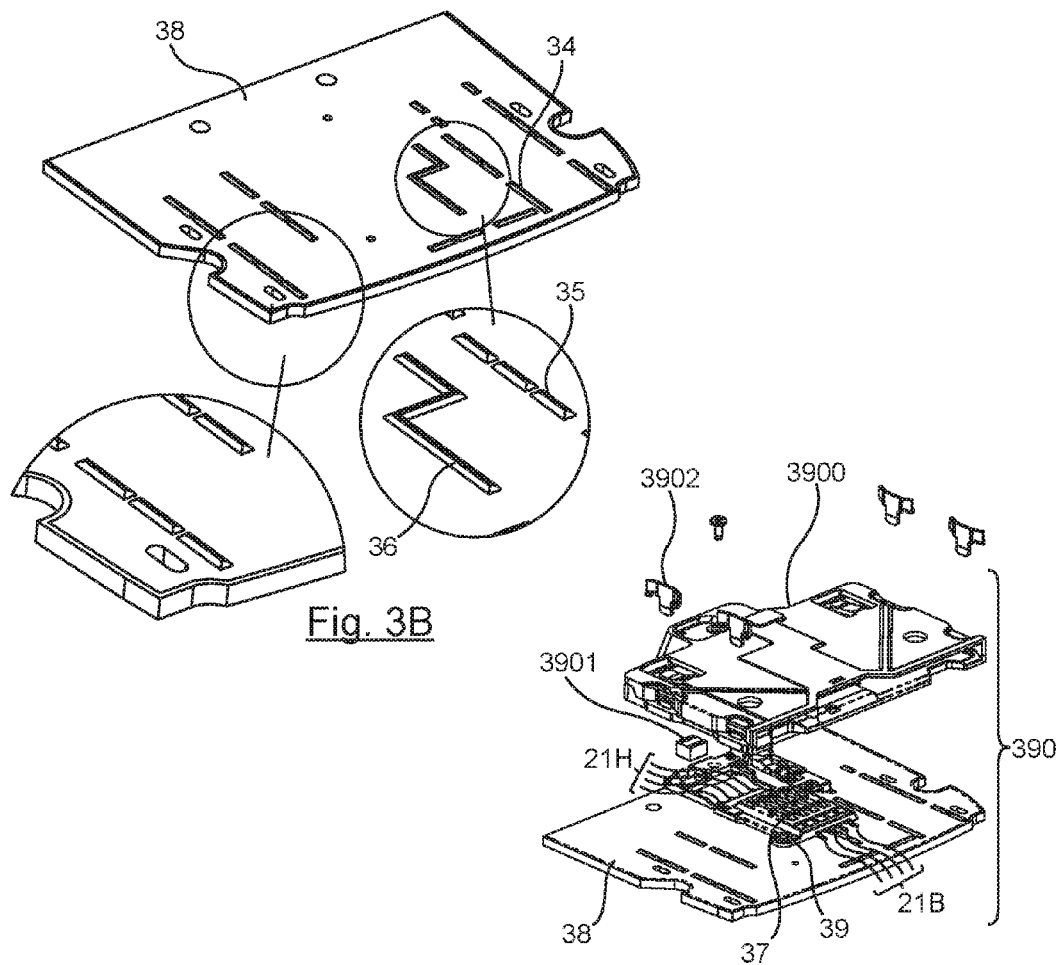

SUPPORT ENTERING INTO THE FABRICATION OF AN ELECTRONIC DEVICE, CORRESPONDING MEMORY CARD CONNECTOR, MEMORY CARD READ TERMINAL AND MANUFACTURING METHOD

1. CROSS-REFERENCE TO RELATED APPLICATIONS

This Application is a Section 371 National Stage Application of International Application No. PCT/EP2014/072821, filed Oct. 24, 2014, the content of which is incorporated herein by reference in its entirety, and published as WO 2015/062981 A1 on May 7, 2015, not in English.

2. FIELD OF THE INVENTION

The invention is situated in the field of electronics and more particularly that of the protection of signals travelling in a circuit, in a magnetic read head or again the protection of the balls of a ball grid array (BGA) corresponding to an integrated circuit pack to be soldered to a printed circuit board.

The invention is therefore aimed at an application in the field of memory card readers or magnetic read head readers or readers comprising a BGA pack.

According to one particular example, an object of the invention is a memory card reader comprising a memory card (MC) connector that is to be inserted into a magnetic card reading terminal. According to this particular example, such a terminal therefore comprises a memory card reader or it can be a payment terminal or again an identification terminal.

3. PRIOR ART

The memory card reading terminals, with magnetic read heads or again comprising a BGA pack comprise not only a memory card reader but also a certain number of components such as a keyboard, a screen, one or more processors of the memory, an electrical power supply source.

Over the past several years, the functions of these terminals have greatly increased in number. This is especially true for payment terminals.

Thus, in addition to the payment function, the terminals embed network communications functions, contactless memory card detection functions, token (for example loyalty token) managing functions, etc.

In addition to the great increase in the numbers of such auxiliary functions, the terminals must also withstand the various attacks or attempts at fraud to which they are often subjected. Thus, in order to obtain homogeneity of resistance to attack in terminals, international standards have been laid down. In the field of payment, the PCI PED (Payment Card Industry—Pin Entry Device) standard lays down requirements in terms of intrusion and the detection of attempted attacks on terminals. This is not the only standard in force.

However, because of these standards, terminals which previously had little protection are gradually being replaced by increasingly secured terminals. Among the different aspects related to the securing of the terminals, industrialists in the sector are paying more special attention to protecting the memory card reader, or again readers with magnetic read heads, and more generally to protecting the sensitive signals of the payment terminal.

For example, the memory card reader indeed is a relatively weak link in the memory card reading terminal. This is due to the fact that the memory card reader has a slot for inserting the memory card, and this slot makes the interior of the terminal accessible from the exterior.

Attackers more particularly seek to obtain access to the memory card connector.

The memory card connector is that part of the memory card reader that comes into contact with the chip and the microprocessor embedded in the memory card.

Referring to FIG. 1, we describe a classic assembly of a memory card reader. This memory card reader comprises a memory card reader body 10 having a slot 11 for inserting a memory card. The memory card connector is directly integrated into the memory card reader. It comprises connection pins 12 for connection to the printed circuit board (PCB) 13 (seen in a partial view). The PCB 13 also has electronic components 14. To protect the memory card reader 10, it is covered with an element 15 providing full protection as well as a front protection.

Figure 2A:
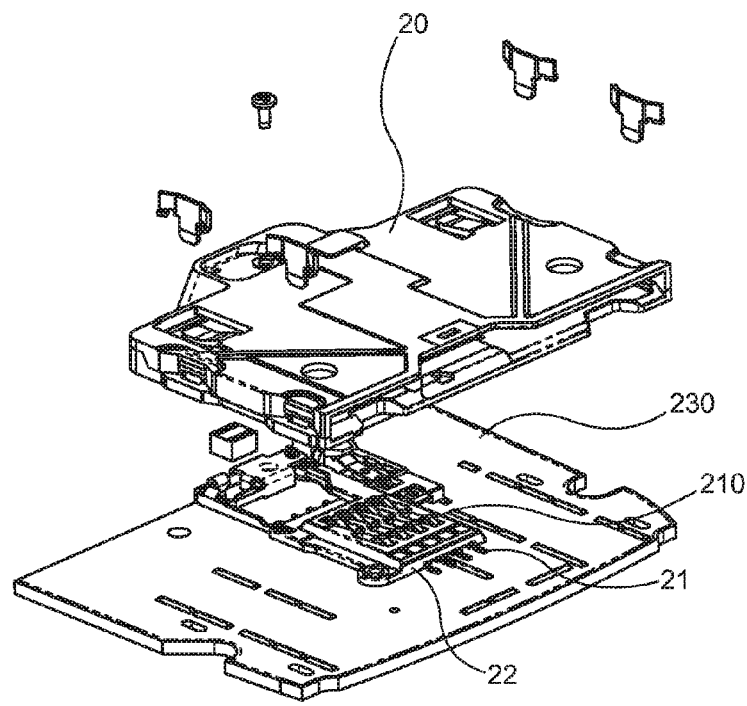

Another assembly is also illustrated by FIG. 2A.

In particular, according to this solution, the memory card reader 22 is independent of the body of the memory card reader 20. Thus, according to this proposal, the memory card connector 22 is not assembled with the body of the memory card reader 20 and then assembled with the printed card board (PCB) 230 of the reading terminal. The technique described proposes firstly to affix the memory card connector 22 to the PCB 230 and then to affix the body of the memory card reader 20 over the memory card connector 22. In other words, it will be understood that this assembly is not at all of the same nature as the assembly of FIG. 1 since the memory card connector is covered by the body of the memory card reader which protects it so to speak.

When an attacker manages to obtain access to this memory card connector in either of the configurations described here above, without being spotted by anyone, he can then intercept and read the data exchanged between the chip or the microprocessor of the card and the processor of the memory card reading terminal.

In particular, the attacker seeks to access the I/O signal traveling on a metal strip 210 between the memory card (smart card) and the memory card connector. The metal strip 210 consists of a flexible part setting up contact with the memory card and a part soldered to the PCB 230. The attacker seeks especially to intercept the I/O signal via the part soldered to the PCB 230.

Among the pieces of data intercepted, we can cite especially the secret code entered by the customer when the secret code is asked for. In certain smart cards, this secret code can be conveyed without encryption.

This explains why numerous efforts are being made to secure the memory card reader or, in other examples, to secure terminals comprising magnetic read head readers or comprising a BGA pack.

Thus, for example, memory card readers have been provided with a latticed protection. This protection prevents introduction by piercing the terminal. When an object tries to penetrate the protective enclosure, a short-circuit is produced, then causing the terminal to be put out of operation.

These efforts to set up protection have led to great complexity of manufacture, and the cost of manufacture has also increased. At present, the requirements in terms of security standards are such that, to manufacture a read terminal, it is necessary to provide for a mix of numerous steps entailing, at the same time, the sequenced soldering of components, the need to have available components resistant to re-melting, etc. In addition to the complexity of manufacture of the terminal, these methods make the maintenance of the terminals produced highly complex or even impossible, thus giving rise to many difficulties as much for the maintenance service providers as for the manufacturer of the memory card reading terminal.

In particular, with respect to memory card connectors, components are used to protect the "sensitive" signals that travel therein. More specifically, referring to FIG. 2B which shows a magnification of the assembly configuration proposed in FIG. 2A, these components 23 are laid out on a support (generally a printed circuit board (PCB)) so as to form, by juxtaposition, baffles or physical protection barriers making it difficult to access the sensitive signals that travel for example inside the memory card connector 22.

Such a physical barrier 23 for components could also be used in the classic assembling configuration represented by FIG. 1 to protect the electronic components 14.

In particular, such sensitive signals travel in the pins 21 of the memory card connector making it possible to come into contact with corresponding areas of the memory card. These pins 21 are generally ends of metal spring blades 210 which get positioned on the surface of the memory card.

The drawback of the current technique lies in the need to solder these components 23, in proximity to the signal to be protected. This requirement sometimes involves soldering defects or else solders of components (these components constituting the physical protection barrier, or again components in which the sensitive signals will travel) that become prone to damage because of successive steps of heat treatment. These soldering defects or damage-prone solders are very difficult to detect and lead to difficulties of integration especially when one of the components gets unsoldered and therefore becomes mobile within the electronic device and therefore liable to cause deterioration of the electronic device.

Conversely, if the components 23 are not soldered very close to the signal or signals to be protected, then a lengthier, wider and higher protection barrier needs to be set up. This greatly increases the number of components 23 to be soldered and the drawbacks related to the soldering of such components.

In particular, such physical protection barriers based on the layout of the components 23 show poor resistance to climatic conditions.

Besides, such components 23 are conventionally called "fictitious" components because their only function is the physical protection of the sensitive signals through their layout on the support. These "fictitious" components are therefore not connected to other components and are devoid of any electronic function.

Thus, such physical protection barriers based on the layout of the components also prove to be unnecessarily costly.

There is therefore a need to provide a support structure that plays a part in the manufacture of the electronic device such as a memory card connector or a memory card reader, is intrinsically secured, has low complexity and entails limited production costs.

4. SUMMARY OF THE INVENTION

The described technique proposes a novel solution that does not have the drawbacks of the prior art, in the form of a support serving in the manufacture of an electronic device, said support comprising at least one component to be protected and at least one three-dimensional element with a height at least equal to the height of an electronic component, said three-dimensional element being disposed laterally relative to said at least one component to be protected.

According to the technique described, such a three-dimensional element is constituted by a permanent assembling or joining material.

It is thus possible to avoid the use of "fictitious" components whose function is limited to forming a physical protection barrier to protect "sensitive" components from fraudulent access aimed at damaging the electronic printed circuit board or the components mounted on the support.

The technique described thus enables savings in the costs of implementing such "fictitious" components having no electronic function.

Besides, the technique described diverts the permanent assembling material from its conventional use of setting up a junction between two elements, namely a component and a support generally corresponding to a printed circuit board.

Indeed, according to the technique described, the permanent assembling material no longer has a function of a junction but a function of physically protecting components.

The components to be protected are for example printed circuit tracks and/or electronic components or "sensitive" mechanical or electronic components and/or again connection pins for which it is sought to prevent any disturbance in the signals that travel therein.

According to the technique described, physical protection against a malicious third party therefore takes the form of a three-dimensional element fixedly joined by one end to the support and chiefly, or even exclusively, formed by a permanent assembling material. Such a component of the three-dimensional element makes it capable of physically preventing access by an instrument, for example a thin metal strip inserted horizontally (in the case of a memory card, beneath the memory card connector) whose purpose is to make connection with the sensitive signals, owing to the three-dimensional volume that it forms. Indeed, through this three-dimensional element, the strip is made to deviate from its path of insertion and therefore cannot access the signal to be protected.

In other words, the three-dimensional element constituted chiefly or exclusively by permanent assembling material according to the technique described plays the role of a protective physical "wall" or "rampart".

Besides, such a three-dimensional element has the advantage of causing little disturbance to the electronic functioning of the electronic components present and active on the support, also called a printed circuit board.

Such three-dimensional protection elements also take advantage of the properties of the permanent assembling material that constitutes them.

In particular, as compared with the flimsiness of a physical protection barrier formed by a juxtaposition of fictitious components, the permanent assembling material has high three-dimensional resistance to climatic conditions, especially humidity, and shows very good mechanical behavior.

Preferably, the permanent assembling material is a brazing material.

A "brazing material" is also called a "brazing paste", "brazing cream", "brazing material" and so on.

Here below, it must be noted that these expressions are equivalent and can replace one another.

The advantage of such a brazing material lies in the fact that the temperature needed for it to get joined with the support and shape the three-dimensional element is below the melting temperature of the support but also that of the component to be protected. Indeed, by definition, the brazing is done without melting of the edges of the elements to be assembled when this technique is used to fixedly attach two distinct elements.

Thus, the forming of the three-dimensional protection element does not lead to any thermal deterioration of the component to be protected or again of the support.

As compared with a brazing material, a soldering material requires the melting of the edges of the assembled elements, which can cause deterioration of the mechanical properties and oxidation of the elements constituting the support and of the support itself.

Besides, the diversity of the brazing materials available in the market is almost unlimited, providing for great flexibility of design of the support according to the technique described. For example, it is possible to use two distinct brazing materials associated with distinct steps of the fixed attachment or joining of the components to the support, these two steps of fixed attachment requiring distinct joining temperatures.

Present-day European directives on the environment are seeking to reduce the use of dangerous materials in electrical and electronic equipment, especially lead, mercury, cadmium, hexavalent chromium, etc.

In particular, the decision to prohibit the use of lead has become effective in France since Jul. 1, 2006 and lead-free brazing materials are preferably used according to the technique described.

Such lead-free brazing materials according to the technique described are for example alloys based on tin, silver and copper. Alloys based on tin, silver and copper (SnAgCu) do not have any eutectic composition and, depending on their composition, have a melting temperature range of 217° C. to 227° C. (Sn Ag3 Cu0.5: 217-218° C., Sn Ag3.9 Cu 0.6: 217-220° C., Sn Ag4 Cu0.5: 217-220° C., Sn Ag1 Cu0.5: 217-227° C.).

According to one particular aspect of the technique described, a section of the three-dimensional element, along the height of said support, is shaped in the form a disc with a flat portion, the flat portion of the disk resting on said support.

For example, the three-dimensional element has the shape of a cylinder with a flat portion, the flat portion of the cylinder resting on said support.

It is therefore easy to identify the three-dimensional protection element according to the described technique by its aspect of a cylinder with a flat portion and therefore to describe the component to be protected which for its part is laterally neighboring on the support.

Advantageously, the height of said three-dimensional is at least equal to 0.2 mm.

Such a minimum height of the three-dimensional element enables physical protection in the event of insertion of a strip or an instrument seeking to damage the component to be protected or again the input/output link (I/O) of this component. This height is greater than the standard height of 150 µm obtained with the classic function of a junction between two elements of a permanent assembling material such as a brazing material.

Thus, the use of the permanent assembling material according to the described technique seeks to increase the height of the deposit with regard to the classic use of a junction, so as to form a three-dimensional protection element acting as a barrier.

For example, the height of the three-dimensional element ranges from 0.2 mm to 0.3 mm so as to protect small-sized components while limiting the space requirement especially when it is sought for example to integrate such a support into ultra-flat memory card (MC) connectors.

Optionally, said three-dimensional element forms a broken line so as to protect at least two sides of said component to be protected.

This alternative embodiment has the advantage of requiring only one three-dimensional protection element to protect several sides of a component to be protected or again to protect a group of components to be protected. Protection by only one three-dimensional protection element averts the need for numerous attachments between separate three-dimensional elements. The manufacturing of the support according to the technique described is therefore simplified.

According to another aspect, the technique described also relates to an electronic device comprising a support according to the technique described as described here above.

For example, such a device corresponds to a memory card connector, an electronic device comprising a microprocessor.

According to another aspect, the technique described also relates to a terminal comprising an electronic device as described here above.

For example, such a terminal is a memory card reading terminal, especially a card with tracks or any terminal requiring the protection of signals travelling in a circuit, in a magnetic read head, or again the protection of the balls of a ball grid array or BGA corresponding to an integrated circuit pack to be soldered to a printed circuit board.

The technique described also pertains to a method for manufacturing a support that plays a part in the manufacturing of an electronic device, said support comprising at least one component to be protected.

According to the technique described, said method of manufacture comprises the following successive steps:

depositing a permanent assembling material on a deposition surface of said support, forming at least one three-dimensional element, with a height at least equal to said at least one component to be protected, by reflow of said deposited permanent assembling material.

The technique used to deposit assembling material is for example of the "inkjet deposition", etching, thin-layer, or other types. The volume of the deposited material will be predetermined according to the depositing technique used so as to enable the subsequent formation of a three-dimensional element with a height at least equal to said at least one component to be protected.

According to one particular embodiment, the step for depositing the permanent assembling material implies the use of a depositing mask also called a silkscreen printing mask. In this case, said method of manufacture comprises the following successive steps:

positioning, on said support, a depositing mask for depositing a three-dimensional element with a height at least equal to the height of an electronic component, said mask comprising at least one aperture positioned laterally relative to the location of said at least one component to be protected on said support, depositing, through said at least one aperture, of a permanent assembling material on a deposition surface of said support, removing said depositing mask, forming at least one three-dimensional element, with a height at least equal to said at least one component to be protected, by reflow of said permanent assembling material deposited on said aperture.

The term "depositing mask" is understood to mean a screen used for "stencil printing" used to reproduce the deposition of three-dimensional elements several times on a series of supports processed successively by the method according to the technique described. The aperture or apertures defined in the silkscreen printing mask (to make a stencil) define the surfaces of deposition of the permanent assembling material which cover the zone or zones of the support, also called surface or surfaces of the support, corresponding to the surface of fixed attachment or fixed joining, with the support, of the three-dimensional element or elements obtained after reflow process according to the technique described.

The advantages of this method described are the same as those presented with reference to the support according to the technique described and are aimed at replacing the conventional physical protection barriers based on fictitious components by at least one three-dimensional element chiefly constituted by a permanent assembling material, preferably a brazing material. These advantages are therefore not described in more ample detail. In particular, such a method of manufacture is simple to implement and easy to carry out on an industrial scale.

According to one variant, such a method of manufacture comprises a step for adjusting the height of said at least one three-dimensional element.

In particular, such a heightwise adjustment is obtained for example by bringing about a variation in the ratio between the width of the surface for depositing permanent assembling material (corresponding to the width of the apertures of the silkscreen printing mask) and the width of the zone or zones (band or bands) of the support corresponding to the surface for the fixed attachment, with the support, of the three-dimensional element or elements obtained after reflow process.

In addition, depending on the sense of passage (parallel or perpendicular) of the scraper used to deposit the assembling material relative to the length of the three-dimensional element, the thickness after reflow can be greater (with an additional thickness due to a "bead" of brazing paste obtained for a length of three-dimensional element perpendicular to the sense of passage), which leads to a very great overall thickness after reflow.

According to one particular embodiment, the ratio R between the width $L_{DEP}$ of said surface for depositing said permanent assembling material and the width $L_o$ of said three-dimensional element is for example $2<R<4$.

In other words, there is a ratio R of the order of three between the width of deposition of the assembling material and the support zone covered by the three-dimensional element obtained after reflow process.

This precaution especially prevents reflow beads which could hinder the functioning of the components of the support while at the same time giving the three-dimensional element a sufficient height.

Indeed, a ratio of two between the width $L_{DEP}$ of said depositing surface of said permanent assembling material and the width $L_o$ of said three-dimensional element obtained after reflow process would not make it possible to obtain a three-dimensional protection element of a height sufficient to "block" the path of insertion of a fraudulent instrument.

Besides, a ratio of four or five between the width $L_{DEP}$ of said depositing surface of said permanent assembling material and the width $L_o$ of said three-dimensional element increases the risk of appearance of conductive beads of assembling material.

Indeed, the presence of beads is detrimental firstly because their location is random and their behavior on the board is fairly limited and secondly because these beads are conductive, which means that, during the lifetime of the product (with vibrations, impacts, climatic conditions, etc.), these beads can get detached from the circuit and come into contact with the active components leading to short-circuits.

The ratio R between the width $L_{DEP}$ of said deposition surface of said permanent assembling material and the width $L_o$ of said three-dimensional element is such that $2<R<4$.

For example, the width of said three-dimensional element obtained after reflow process is of the order of 1 mm and said width of deposition of said permanent assembling material is of the order of 3 mm.

5. FIGURES

Figure 2B:
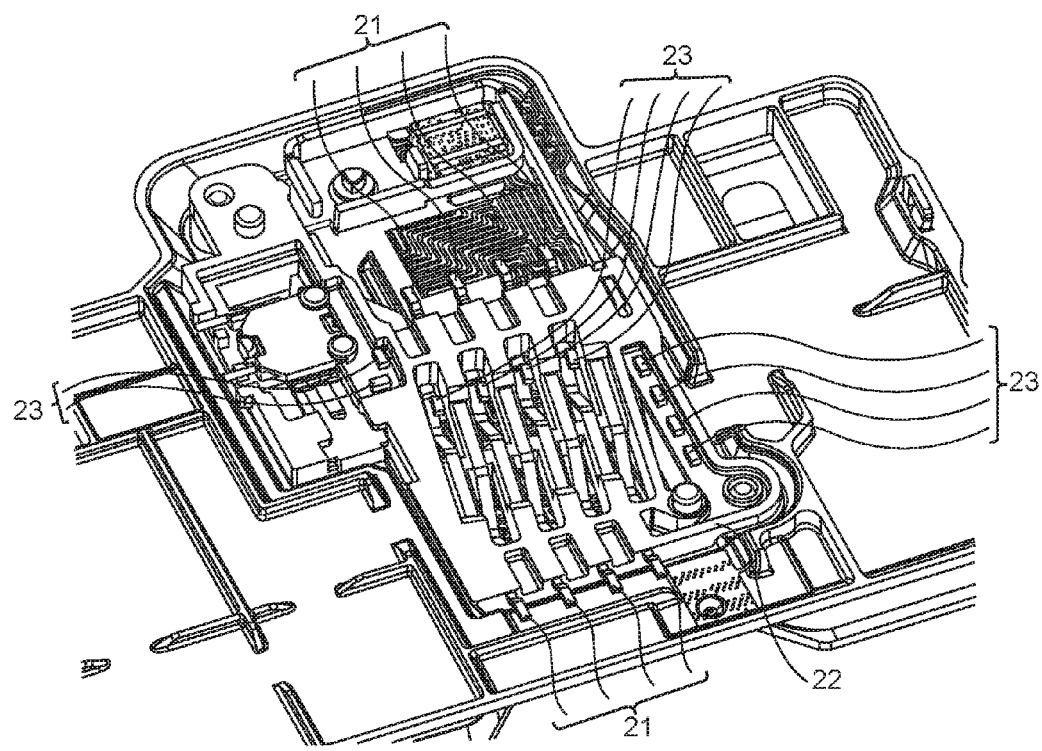
Figure 3A:
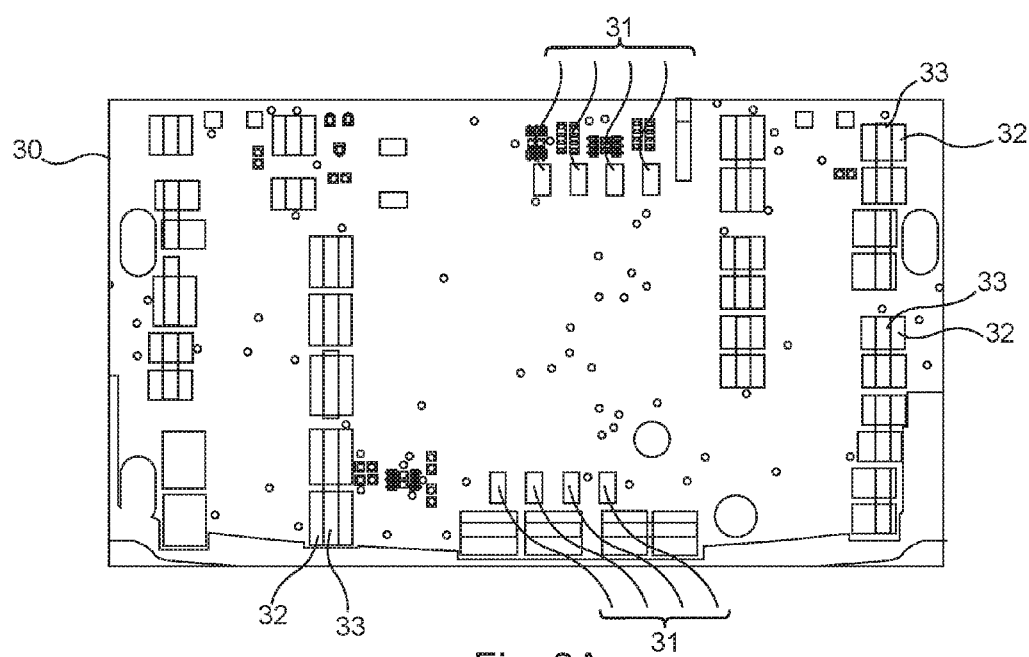

Other features and advantages of the technique described shall appear more clearly from the following description of a preferred embodiment, given by way of a simple, illustratory and non-exhaustive example and from the appended drawings of which:

FIG. 1 already presented describes the classic architecture of a memory card reader;

FIGS. 2A and 2B already presented respectively describe the architecture of another configuration of assembling of a memory card reader and a physical protection barrier for a component to be protected;

FIGS. 3A to 3C respectively illustrate a support according to the technique described after deposition of a permanent assembling material to form a three-dimensional element physically protecting a component to be protected, this support finalized after the final step of manufacture of the method according to the described technique, and the assembling of a terminal according to the described technique;

FIG. 4 illustrates the method of manufacture according to the described technique;

FIGS. 5A and 5B respectively illustrate the step of deposition and the step of formation in the method of manufacture according to the technique described.

6. DETAILED DESCRIPTION OF THE INVENTION

6.1 Reminder of the Principle of the Invention

The general principle of the technique described consists in modifying the constitution of a support comprising at least one component to be protected, in diverting a permanent assembling material from its classic use to form a three-dimensional element, the height of which is at least equal to the height of an electronic component, to act as a physical protection barrier for the component to be protected.

Such three-dimensional protective elements are therefore formed chiefly by a permanent assembling material that costs little and is easily available because it is also used classically to fixedly attach an electronic component to the support.

Thus, there is no obvious way to divert the function of a material classically used to fixedly attach two elements, namely for example a component and the support, in order to use it directly to form three-dimensional protection elements.

The general principle of the technique described is described with reference to FIG. 3A representing the support after deposition of the permanent assembling material.

Thus, this representation of the support according to the technique described corresponds to an "image" of the support between the deposition step and the formation step of the method for manufacturing the support as described in detail here below. Thus, this representation corresponds to the superimposition 30 of a mask (also called a stencil or a silkscreen print) on the support.

In FIG. 3A, the components to be protected are represented by rectangles 31 on the superimposition 30 of the mask and the support corresponding to a printed circuit board (PCB) also called an electronic board.

According to the embodiment represented in FIG. 3A, eight rectangles corresponding to the zones for soldering active components are shown. These eight rectangles 31 correspond for example to the eight connection pins 21 of the memory card connector 22 as represented in FIG. 2B. Among these eight pins, there are especially a pin on which the I/O signal to be protected is accessible.

In addition, the superimposition 30 of the mask and of the support comprises, after deposition of the permanent assembling material, layers also called surfaces of deposition of this permanent assembling material. These layers or surfaces of deposition are situated at the apertures 32 of the silkscreen mask superimposed on the zones 33 of the support that correspond to the surface of fixed joining, with the support, of the three-dimensional elements obtained after reflow process. Such layers of permanent material, which in this case is preferably a brazing material (also called a brazing cream or paste), have a greater width after deposition, and preferably a width that is about three times greater than the width of the zone 33 of the support covered with the three-dimensional element obtained after the reflow process according to the technique described here, these layers being deposited on the three-dimensional element in order to prevent the generation of conductive beads during the reflow process since these conductive beads could impair the working of the components within the support.

After removal of the silkscreen print mask and reflow process, the support 38, finalized according to the technique described as shown in FIG. 3B, is obtained. Thus, the support 38 according to the technique described comprises three-dimensional elements 34, 35 and 36 for the physical protection of the components to be protected. These components to be protected correspond, according to the illustration of FIG. 3C, to the connection pins $21_H$ of the independent memory card connector 39 of the memory card reading terminal 390 obtained after assembling of the memory card reader body 3900 with the support 38 obtained according to the technique described.

The connection between these two elements is obtained by means of an elastomer connector which sets up permanent pressure, for example a connector of the Zebra type (Registered Mark) (3901) as shown in FIG. 3C.

In addition, the memory card reader body also comprises apertures for the insertion of metal anchoring protruding tips 3902 fixing the support according to the technique described in the memory card reader body 3900. These metal protruding tips are soldered with the brazing paste (also called brazing cream). Such metal anchoring protruding tips hold the connector during repeated insertions of a memory card into the memory card reader. These metal anchoring protruding tips can also have a particular shape suited firstly to fulfilling a function of guiding the memory card in the reader and secondly, if need be, obtaining an electrostatic discharge of the ridges of the inserted card.

Each of these three-dimensional elements 34, 35, 36 are laid out laterally relative to the component to be protected, namely the connection pins $21_H$ of the memory card connector so as to "physically defend" at least one side, as if it were as a wall or a rampart, against any malicious intrusion.

The advantage of the composition of the three-dimensional element based on permanent assembling material is that it enables high flexibility of shape and length of the protective three-dimensional elements.

Thus, it is possible to have three-dimensional elements in the form of a broken line such as the element 36 which enables the protection, along an angle, of the components to be protected but also elements of various lengths such as the great length of the three-dimensional element 34 which replaces four fictitious components of the prior art or again the small length of the three-dimensional element 35 which gives a protection barrier capable of being inserted in the housings of the metal spring blades 37 which get positioned on the surface of the chip.

The three-dimensional elements 34 to 36 have the characteristic shape of a cylinder with a flat portion, this flat portion resting on the support. In other words, the height-wise section of the three-dimensional element has the shape of a disk with a flat portion.

Indeed, this characteristic shape of the three-dimensional protection element according to the technique described is obtained during the reflow process. Indeed, the capillarity of the permanent assembling material corresponding, according to the example illustrated in FIGS. 3A and 3B, to a brazing material produces a grouping of this material at the level of the support zones 33 and possibly a shrinking of its volume. In particular, with respect to the width of the deposition of the layer of permanent assembling material in the aperture 32 of the deposition mask in FIG. 3A representing the support after deposition of the permanent assembling material, the three-dimensional element obtained after reflow process has a width substantially close to the width of the zones 33 of the support.

The shape resulting from this shrinkage by reflow process characteristically has a section along the height of the support having the shape of a disk with a flat portion and a height H at least equal to that of the electronic component of the order of 0.2 mm to 0.3 mm in order to provide physical protection while at the same time enabling integration into an ultra-flat connector. For example, a height H of 0.5 mm to 0.6 mm is obtained for a three-dimensional element, the length of which is perpendicular to the sense of passage of a scraper for depositing assembling material. Obtaining such a height of 0.5 mm to 0.6 mm is especially associated with the formation of "beads" of brazing paste described here above.

Thus, a protection barrier corresponding to the three-dimensional element chiefly constituted by a brazing material is easily identifiable with respect to the fictitious components used according to the prior art.

6.2 Description of the Method of Manufacture

Referring to FIG. 4, we present the method of manufacture 40 of a support according to the technique described.

Such a method comprises the following successive steps:

Positioning 41, on the support, a mask for deposition of a three-dimensional element with a height at least equal to the height of an electronic component, the mask comprising at least one aperture 32 positioned laterally relative to the location of said at least one component to be protected on said support, Depositing 42 a permanent assembling material on the support through the aperture 32, removing 43 said deposition mask, forming 44 at least one three-dimensional element with a height at least equal to said at least one component to be protected by reflow of said permanent assembling material deposited on said aperture 32.

More specifically, the method is one of manufacturing barriers for the physical protection of components to be protected by deposition of a permanent assembling material preferably brazing paste, according to a screen-printing method and also over-printing method corresponding to the fact that the deposition of a brazing cream is about three times wider than the width of the support covered with the three-dimensional element which will be obtained after reflow process according to the technique described herein.

Thus, first of all on the support that is to be improved, a mask is placed 41 also called a screen-printing screen or stencil.

This mask comprises apertures 32 such as those represented with reference to FIG. 3A. These apertures 32 correspond to the deposition areas.

The masks also called stencils or again silk-screen printing screens are sometimes prepared from polyester sheets or copper alloys.

These materials are used to an increasingly smaller extent because they are less reliable and more easily damaged.

As an alternative, it is possible to use specific stainless sheets whose cost is reasonable while at the same time providing high stability and long service life.

Sometimes, it can be necessary to resort to other materials, especially if the apertures are truly very small or if it is necessary to have a greater deposit than that which would be permitted with stainless steel sheets of this kind. In this case, the invention uses for example a nickel sheet which has much lower adhesion to the walls and therefore provides for a smaller surface-to-thickness ratio. The flip side here is the high cost of these nickel sheets which limits their use.

There also exist "adhesive point" stencils which are less complicated but have drawbacks similar to those of the above stencils. The essential difference is the thickness of the sheet which is generally 250 µm.

The cutting out of apertures 32 in the silkscreen stencil is done for example by laser rays. These laser rays are generated, for example, by means of laser diodes which enable very fine cutting and very swift implementation.

The outline of the aperture 32 is often trapezoidal, with the base of the trapezoid being in contact with the circuit, in order to favor the demolding process.

During the deposition 42 and as illustrated by FIG. 5A, the brazing paste is pushed into the apertures of the mask (not shown in FIG. 5A) by a scraper so that it can be deposited on the surface of the support 53. The support 53 is coated with a varnish 52 and has a support zones with a thickness $L_o$, "free" of varnish, receiving the permanent assembling material and corresponding to the surface for the fixed attachment, with the support, of the three-dimensional elements obtained after reflow process once the soldering is done.

The volume of a brazing paste to be deposited is for example determined by the surface of the receiving zone and the thickness of the stencil which is generally 150 µm. If the deposit is not enough, the protective three-dimensional element will not be accurately attached. If it is excessive, the paste can overflow and cause bridges between the zones.

The quality of the deposition depends on numerous factors, namely the grain of the paste, its viscosity, the quality of the support, its thickness and the strength of retention on its walls, the dimensions of the aperture, the temperature curves during the passage into the oven inter alia.

In addition, the thickness of the stencil is also decisive. The adhesion of the paste to the walls depends on the ratio between the surface of the aperture and the thickness of the material.

Thus, it is optionally possible to act on these factors to adjust (410) the height of the three-dimensional element of the support.

The adjusting REG 410 of this height consists for example in adjusting the ratio between the width of the aperture 42 in the silk-screen printing stencil corresponding to the width of deposition $L_{DEP}$ of the permanent assembling material and the width $L_o$ of the zone of the support covered by the three-dimensional element obtained after reflow process.

Advantageously, the width of the deposition $L_{DEP}$ of the permanent assembling material is three times greater than the width $L_o$, the zone on the support covered by the three-dimensional element obtained after the reflow process.

Such a ratio provides for a height of the three-dimensional element (for example between 0.2 mm and 0.3 mm, for a deposition width $L_{DEP}$ of the permanent assembling material equal to 3 mm and a width $L_o$ of 1 mm for the zone of the support covered by the three-dimensional element obtained after reflow process) that is sufficient for it to fulfill the role of protecting sensitive components.

Then, the deposition mask is removed (43) (or again demolded).

Once the brazing paste has been deposited, the components to be protected are placed COMP (411) according to one option. Positioning the components to be protected after depositing the brazing paste prevents any splashing of the brazing paste on these components and therefore prevents them from undergoing potential deterioration because of this material. Such a deposition of the components to be protected can be done optionally before or after the removal of the deposition mask.

Finally, the method of manufacture implements the formation (44) of the three-dimensional elements by reflow process in a reflow oven, to obtain the support capable of being used to manufacture an electronic device such as a memory card reading terminal (390), an example of which is shown in FIG. 3B.

Optionally, it is possible to again adjust the height of the three-dimensional element mechanically. Indeed, it is possible to touch up the brazing by hand, with a brazing iron, to increase the volume of cream and therefore the height.

The advantage of using a brazing material to form the three-dimensional protective elements is that the temperatures needed so that it joins with the support and form the three-dimensional element is below the melting temperature of the support but also below that of the component to be protected. A deterioration of the component to be protected is therefore prevented because during the reflow process, only the brazing paste reaches its melting temperature, while that of the component is not reached.

Such a reflow process causes a loss in the volume of the brazing paste as shown in FIG. 5B. After reflow process, a three-dimensional element is then obtained, the section of which along the height of the support (53) has the shape of a disk (55) with a flat portion (54), the flat portion (54) lying on the zone of the support.

It must be noted that an excessive width of deposition that does not comply with the recommended ratio, according to which the width of deposition $L_{DEP}$ of the permanent assembling material is about three times greater than the width $L_o$ of the aperture defining the deposition area, would generate conductive beads that are not soldered to the support and therefore devoid of any protective functions.

We therefore obtain a three-dimensional element 55, the height H of which is for example 0.2 mm to 0.3 mm for a deposition width $L_{DEP}$ of permanent assembling material equal to 3 mm and a width $L_o$ of 1 mm for the zone of the support covered by the three-dimensional element obtained after reflow process. The width $L_o$ of the zone of the support is therefore equal to the width of the surface of the three-dimensional element lying on the support (53). This height, which is of the same order as that of an electronic component, therefore fulfills the role of a protection wall.

It must be noted that the three-dimensional elements for protecting a support are also capable of protecting the components 14 of a classic architecture such as that shown in FIG. 1.

Although the present disclosure has been described with reference to one or more examples, workers skilled in the art will recognize that changes may be made in form and detail without departing from the scope of the disclosure and/or the appended claims.

The invention claimed is:

1. A support serving in the manufacture of an electronic device, said support comprising:
   at least one component to be protected; and
   at least one three-dimensional element with a height at least equal to the height of the electronic component, said three-dimensional element being disposed laterally relative to said at least one component to be protected, and wherein said three-dimensional element is constituted by a permanent brazing assembling material.

2. The support according to claim 1, wherein a section of said three-dimensional element along the height of said support, is shaped in the form of a disc with a flat portion, the flat portion of which rests on said support.

3. The support according to claim 1, wherein the height of said three-dimensional element is at least equal to 0.2 mm.

4. The support according to claim 1, wherein said three-dimensional element forms a broken line so as to protect at least two sides of said component to be protected.

5. The electronic device which comprises a support according to claim 1.

6. A terminal which comprises the electronic device according to claim 5.

7. A method for manufacturing a support serving in the manufacture of an electronic device, said support comprising at least one component to be protected, wherein said method for manufacturing comprises the following successive steps:
   positioning, on said support, a mask for deposition of at least one three-dimensional element with a height at least equal to said at least one component to be protected, the mask comprising at least one aperture positioned laterally relative to a location of said at least one component to be protected on said support,
   depositing a permanent brazing assembling material on said support through said at least one aperture,
   removing said deposition mask,
   forming said at least one three-dimensional element by reflow of said deposited permanent brazing assembling material.

8. The method for manufacturing according to claim 7, wherein the method comprises adjusting said height of said at least one three-dimensional element.

9. The method for manufacturing according to claim 7, wherein a ratio R between a width $L_{DEP}$ of said surface for depositing said permanent brazing assembling material and a width $L_o$ of said three-dimensional element is 2<R<4.

* * * * *